United States Patent
Huang

(10) Patent No.: US 8,264,787 B2
(45) Date of Patent: Sep. 11, 2012

(54) FIXING DEVICE AND VOICE COIL MOTOR USING SAME

(75) Inventor: Chien-Feng Huang, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 52 days.

(21) Appl. No.: 13/044,559

(22) Filed: Mar. 10, 2011

(65) Prior Publication Data
US 2012/0140344 A1    Jun. 7, 2012

(30) Foreign Application Priority Data
Dec. 3, 2010   (TW) .................................. 99142207

(51) Int. Cl.
G02B 7/02   (2006.01)
H02K 41/03   (2006.01)

(52) U.S. Cl. ...................... 359/824; 359/694; 310/12.16

(58) Field of Classification Search .................. 359/824, 359/694; 310/12.16
See application file for complete search history.

(56) References Cited

U.S. PATENT DOCUMENTS

| | | | |
|---|---|---|---|
| 7,851,952 B2 * | 12/2010 | Liao | 310/12.16 |
| 2012/0091827 A1 * | 4/2012 | Chiang | 310/12.16 |

* cited by examiner

*Primary Examiner* — James Jones
(74) *Attorney, Agent, or Firm* — Altis Law Group, Inc.

(57) ABSTRACT

A fixing device includes a stationary frame and a number of elongated resilient tabs. The stationary frame defines a central axis and includes four sidewalls for receiving a number of magnets. Each sidewall includes a receiving hole and at least one protrusion formed on each sidewall at a lower portion thereof. A slot is defined in each protrusion. The tabs correspond to the magnets. Each tab includes an engagement portion, an angled portion, and a contact portion. The angled portion is interconnected between the engagement portion and the contact portion. The engagement portions engage in the respective slots. The contact portions resiliently abut against the corresponding magnets. Each tab is configured to apply a force on the corresponding magnet in a direction toward the central axis.

14 Claims, 5 Drawing Sheets

FIXING DEVICE AND VOICE COIL MOTOR USING SAME

BACKGROUND

1. Technical Field

The present disclosure relates to lens actuators, and particularly, to a fixing device and a voice coil motor using the fixing device to drive a lens barrel.

2. Description of Related Art

A voice coil motor is preferred to drive lenses in image capture devices to implement auto-focus. A typical voice coil motor includes a moveable frame for accommodating a lens barrel with lenses therein, a coil wound around the moveable frame, a number of magnets, a stationary frame for fixing the magnets and accommodating the moveable frame, and a resilient plate interconnecting the stationary frame and the moveable frame. Generally, the magnets are fixed in the stationary frame by glue. However, the glue can overflow to the moveable frame, which may cause the moveable frame to adhere to the stationary frame. When this happens, the moveable frame cannot move.

Therefore, it is desirable to provide a fixing device and a voice coil motor using the same, which can overcome or at least alleviate the limitations described.

DETAILED DESCRIPTION

Figure 1:
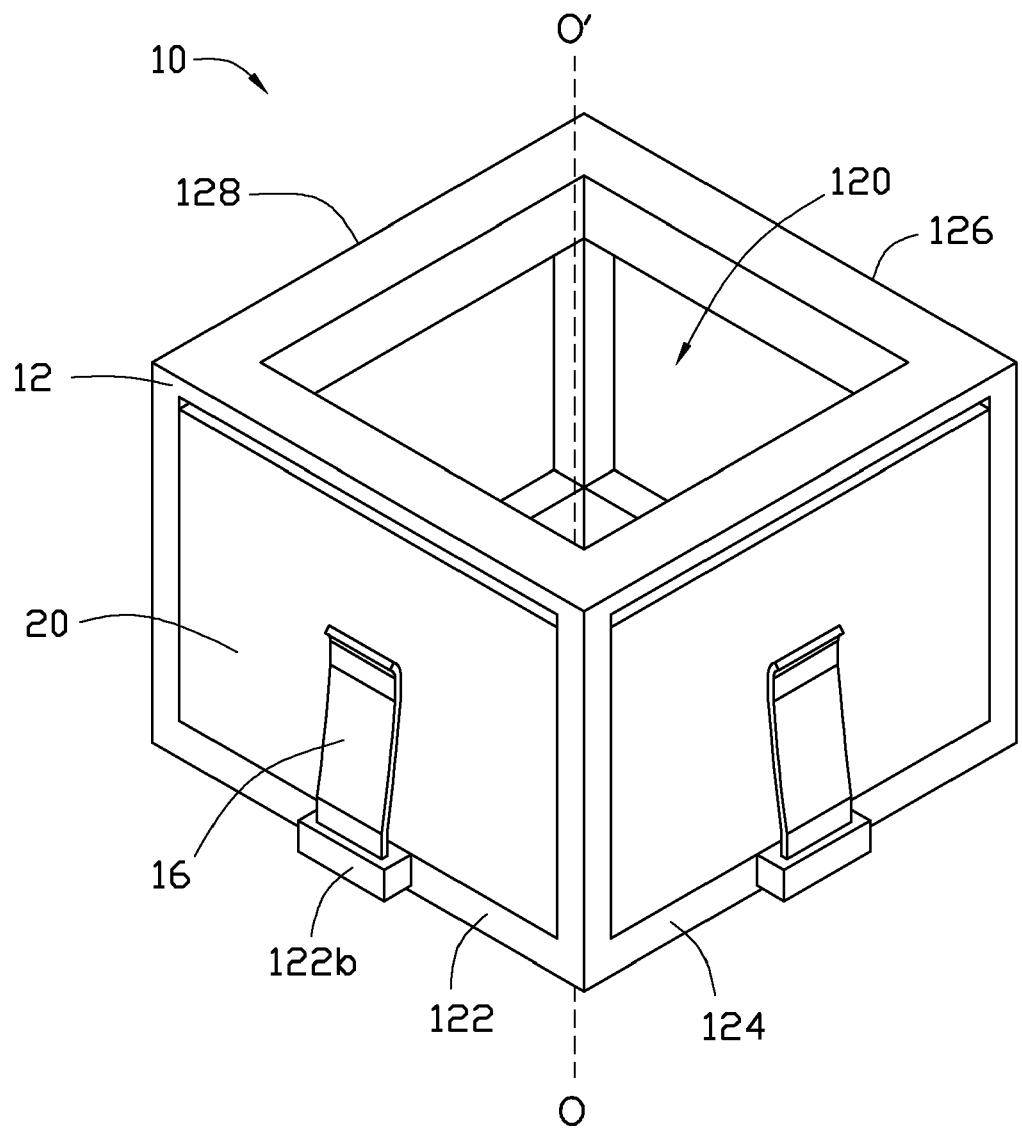
FIG. 1 is a schematic, assembled view of a fixing device, according to a first exemplary embodiment, showing the fixing device fixing four magnets in position.
Figure 2:
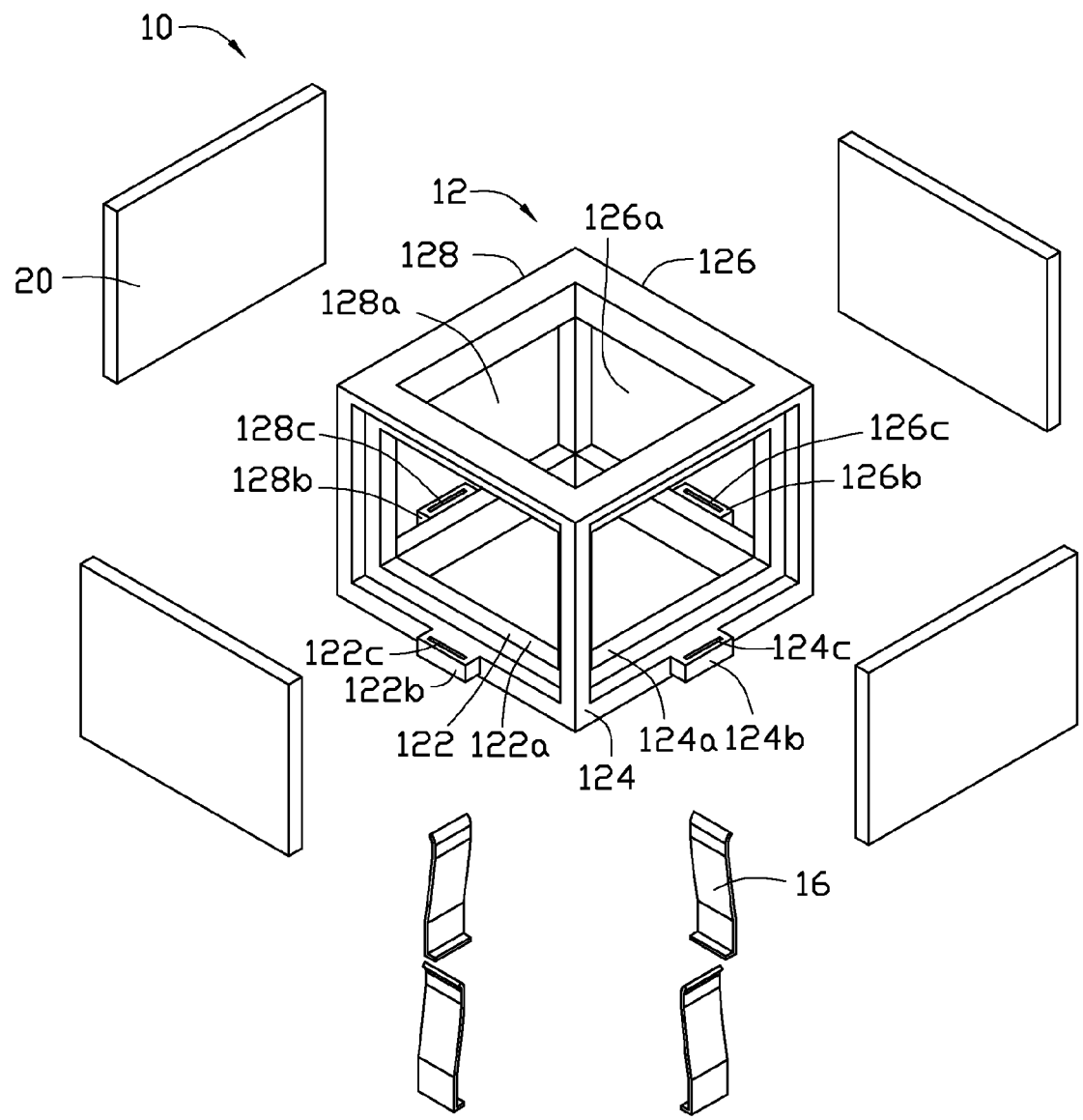
FIG. 2 is an exploded view of the fixing device and the magnets of FIG. 1.
Figure 3:
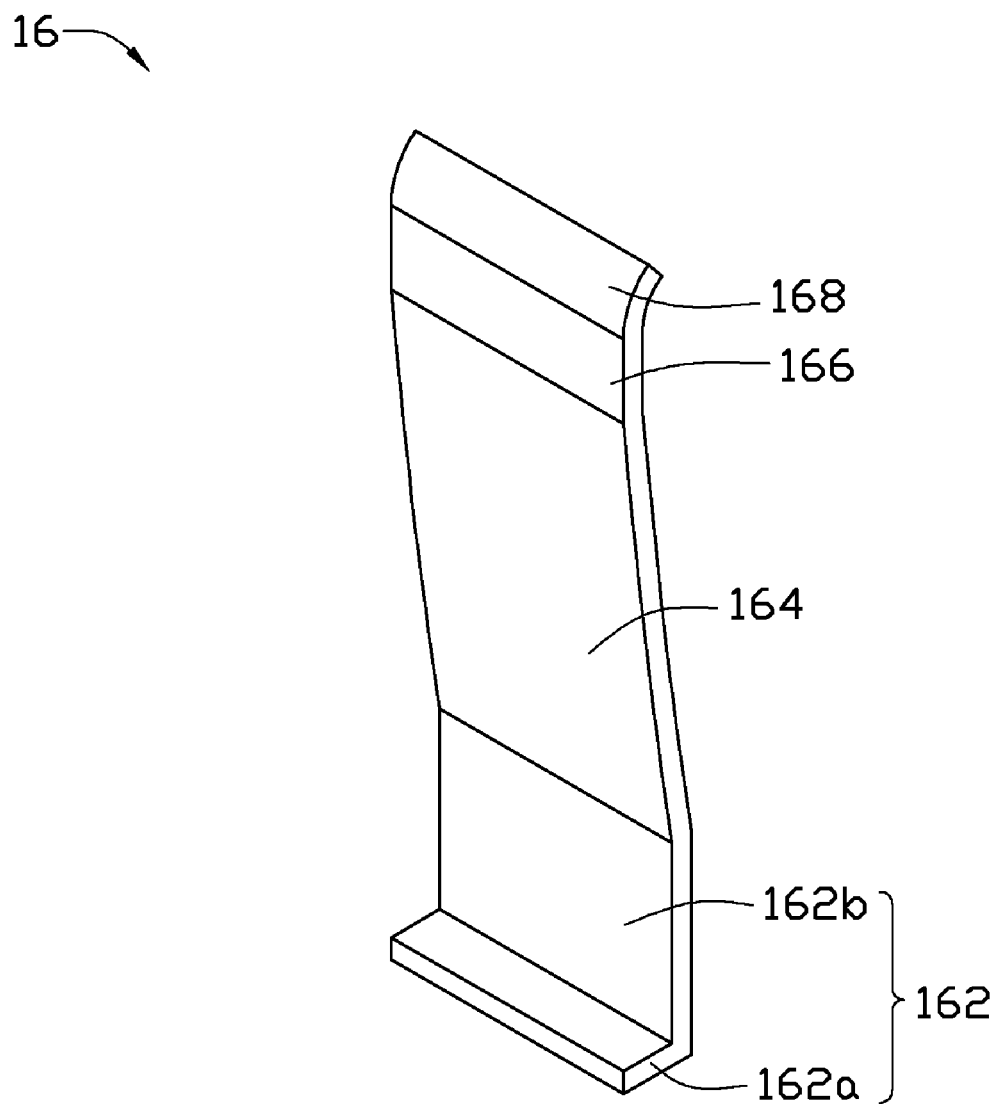
FIG. 3 is an isometric view of a tab of the fixing device of FIG. 1.

Referring to FIGS. 1-3, a fixing device 10, according to a first embodiment, is configured for fixing four magnets 20. The fixing device 10 includes a stationary frame 12 and four elongated resilient tabs 16.

The stationary frame 12 is substantially a cube and defines a central axis OO'. The stationary frame 12 includes a first sidewall 122, a second sidewall 124, a third sidewall 126, and a fourth sidewall 128. The first sidewall 122, the second sidewall 124, the third sidewall 126, and the fourth sidewall 128 are connected end-to-end to each other. The first sidewall 122, the second sidewall 124, the third sidewall 126, and the fourth sidewall 128 cooperatively form a receiving room 120 for receiving a moveable frame (not shown). The first sidewall 122 is substantially parallel to the third sidewall 126. The second sidewall 124 is substantially parallel to the fourth sidewall 128.

The first sidewall 122 defines a first receiving hole 122a. The second sidewall 124 defines a second receiving hole 124a. The third sidewall 126 defines a third receiving hole 126a. The fourth sidewall 128 defines a fourth receiving hole 128a. The first receiving hole 122a, the second receiving hole 124a, the third receiving hole 126a, and the fourth receiving hole 128a are in communication with the receiving room 120.

The first sidewall 122 includes a first protrusion 122b at a lower portion thereof. A first slot 122c is defined in the first protrusion 122b along the central axis OO'. The second sidewall 124 includes a second protrusion 124b at a lower portion thereof. A second slot 124c is defined in the second protrusion 124b along the central axis OO'. The third sidewall 126 includes a third protrusion 126b at a lower portion thereof. A third slot 126c is defined in the third protrusion 126b along the central axis OO'. The fourth sidewall 128 includes a fourth protrusion 128b at a lower portion thereof. A fourth slot 128c is defined in the fourth protrusion 128b along the central axis OO'. In this embodiment, the widths of the first slot 122c, the second slot 124c, the third slot 126c, and the fourth slot 128c exceed the thickness of the tab 16.

Each tab 16 is made of elastic material and includes an engagement portion 162, an angled portion 164, a contact portion 166, and a grip portion 168. The engagement portion 162, the angled portion 164, the contact portion 166, and the grip portion 168 connect each other in that order.

The engagement portion 162 includes a first plate 162a and a second plate 162b perpendicularly extending from the first plate 162a. In this embodiment, the thickness of the first plate 162a is equal to or less than a distance from the bottom of the protrusion 122b, 124b, 126b, or 128b to the bottom of the corresponding sidewall 122, 124, 126, or 128.

The angled portion 164 extends from the second plate 162b. The angled portion 164 inclines relative to the second plate 162b toward the central axis OO'. The contact portion 166 extends from the angled portion 164 and inclines relative to the angled portion 164 in a direction away from the central axis OO'. The grip portion 168 is proximate to the contact portion 166 and bends away from the central axis OO'. In this embodiment, the grip portion 168 extends from the contact portion 166.

In assembly, a magnet 20 is received in the first receiving hole 122a. The second plate 162b, the angled portion 164, the contact portion 166, and the grip portion 168 pass through the first slot 122c. The second plate 162b engages in the first slot 122c and is substantially parallel to the central axis OO'. The first plate 162a is exposed outside the first slot 122c and abuts the bottom of the first protrusion 122b and the lower portion of the first sidewall 122. The contact portion 166 resiliently abuts against the magnet 20 in the first receiving hole 122a and applies a force on the magnet 20 in a direction toward the central axis OO', thereby the magnet 20 is fixed in the first receiving hole 122a. The grip portion 168 is configured for being grasped when the tab 16 is disassembled from the stationary frame 12. Similarly, the other three magnets 20 are respectively fixed in the second receiving hole 124a, the third receiving hole 126a, and the fourth receiving hole 128a by the corresponding tabs 16. During the assembly process, glue is not needed, thus the moveable frame can move in the stationary frame 12.

Figure 4:
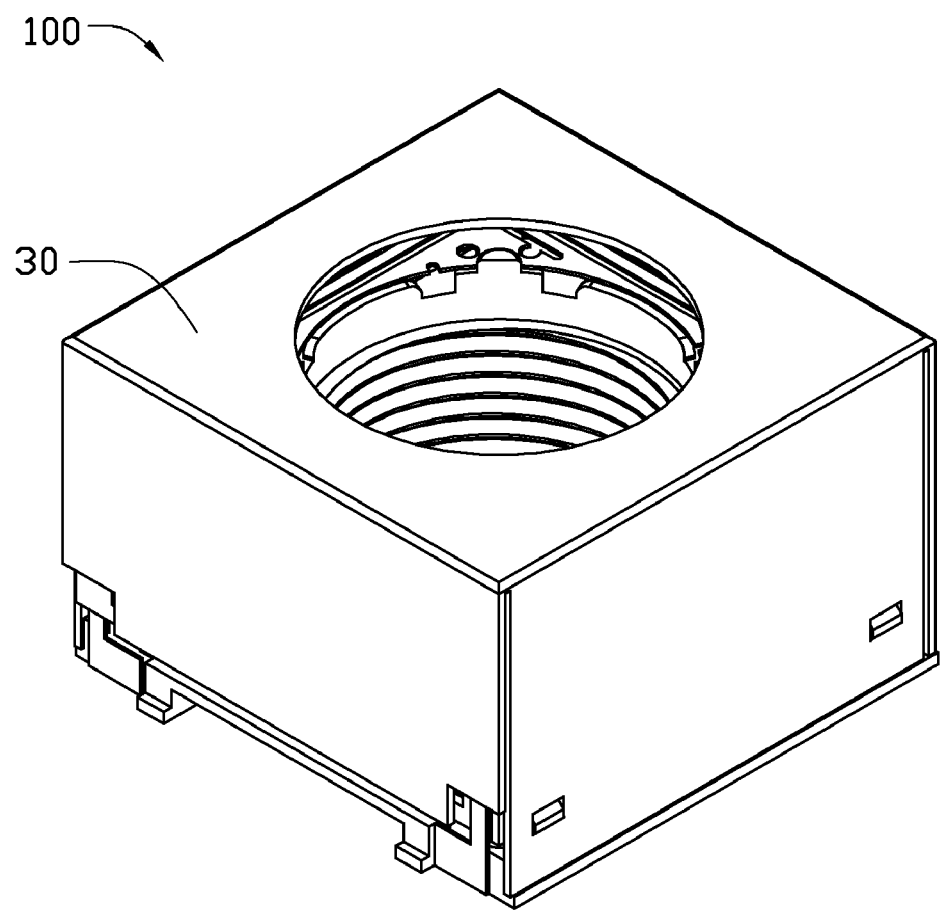
FIG. 4 is a schematic, assembled view of a voice coil motor, according to a second exemplary embodiment.
Figure 5:
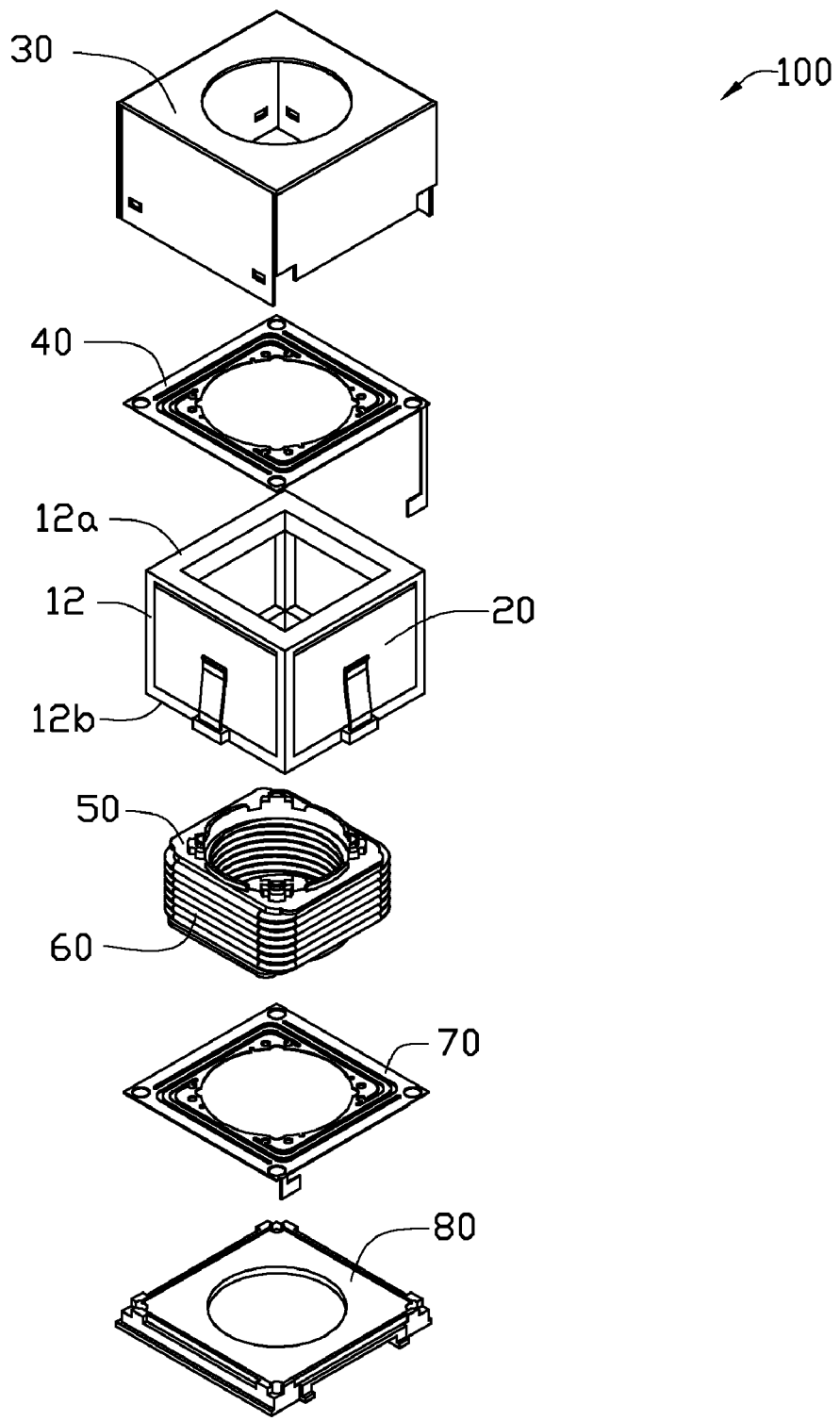
FIG. 5 is an exploded view of the voice coil motor of FIG. 4.

Referring to FIGS. 4-5, a voice coil motor 100, according to a second exemplary embodiment, is shown. The voice coil motor 100 includes a housing 30, an upper resilient plate 40, the stationary frame 12, the four magnets 20 fixed in the stationary frame 12, a moveable frame 50 received in the stationary frame 12, a coil 60 wrapped around the moveable frame 50, a lower resilient plate 70, and a base 80.

The upper resilient plate 40 is attached to an upper side 12a of the stationary frame 12. The lower resilient plate 70 is attached to a lower side 12b of the stationary frame 12. The upper resilient plate 40 and the lower resilient plate 70 interconnect the stationary frame 12 and the moveable frame 50. The stationary frame 12 is supported on the base 80. The housing 30 covers the upper resilient plate 40, the stationary frame 12, the four magnets 20, the moveable frame 50, the coil 60, and the lower resilient plate 70 and is supported by the base 80.

The advantages of the voice coil motor 100 of this embodiment are similar to those of the fixing device 10 of the first embodiment.

It is to be understood, however, that even though numerous characteristics and advantages of the present embodiments have been set fourth in the foregoing description, together with details of the structures and functions of the embodiments, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A fixing device comprising:
    a stationary frame defining a central axis and comprising four sidewalls for receiving a plurality of magnets, each sidewall having a receiving hole and at least one protrusion formed on each sidewall at a lower portion thereof, a slot defined in each protrusion; and
    a plurality of elongated resilient tabs corresponding to the magnets, each tab comprising an engagement portion, an angled portion, and a contact portion, the angled portion interconnected between the engagement portion and the contact portion, the engagement portions engaging in the respective slots, the contact portions resiliently abutting against the corresponding magnets, each tab configured to apply a force on the corresponding magnet in a direction toward the central axis.

2. The fixing device as claimed in claim 1, wherein each tab further comprises a grip portion, and each grip portion proximate to the contact portion, each grip portion extending in a direction away from the corresponding magnet.

3. The fixing device as claimed in claim 2, wherein each engagement portion comprises a first plate and a second plate substantially perpendicularly extending from the first plate, the second plate engaged in the corresponding slot, the first plate exposed outside the corresponding slot and abutting on the corresponding protrusion.

4. The fixing device as claimed in claim 3, wherein the second plate is substantially parallel to the central axis.

5. The fixing device as claimed in claim 4, wherein each angled portion extends from the corresponding second plate and is inclined toward the central axis, each contact portion extends from the corresponding angled portion and is inclined in a direction away from the central axis.

6. The fixing device as claimed in claim 5, wherein each grip portion extends from the corresponding contact portion.

7. The fixing device as claimed in claim 5, wherein the width of the slot is substantially equal to the thickness of the second plate.

8. A voice coil motor comprising:
    a plurality of magnets;
    a fixing device comprising:
        a stationary frame defining a central axis and comprising four sidewalls for receiving the magnets, each sidewall having a receiving hole and at least one protrusion formed on each sidewall at a lower portion thereof, a slot defined in each protrusion; and
        a plurality of elongated resilient tabs corresponding to the magnets, each tab comprising an engagement portion, an angled portion, and a contact portion, the angled portion interconnected between the engagement portion and the contact portion, the engagement portions engaging in the respective slots, the contact portions resiliently abutting against the corresponding magnets, each tab configured to apply a force on the corresponding magnet in a direction toward the central axis;
    a moveable frame received in the stationary frame;
    a coil wrapped around the moveable frame;
    an upper resilient plate attached to an upper side of the stationary frame and interconnecting the stationary frame and the moveable frame; and
    a lower resilient plate attached to a bottom side of the stationary frame and interconnecting the stationary frame and the moveable frame.

9. The voice coil motor as claimed in claim 8, wherein each tab further comprises a grip portion, and each grip portion proximate to the contact portion, each grip portion extending in a direction away from the corresponding magnet.

10. The voice coil motor as claimed in claim 9, wherein each engagement portion comprises a first plate and a second plate substantially perpendicularly extending from the first plate, the second plate engaged in the corresponding slot, the first plate exposed outside the corresponding slot and abutting on the corresponding protrusion.

11. The voice coil motor as claimed in claim 10, wherein the second plate is substantially parallel to the central axis.

12. The voice coil motor as claimed in claim 11, wherein each angled portion extends from the corresponding second plate and is inclined toward the central axis, each contact portion extends from the corresponding angled portion and is inclined in a direction away from the central axis.

13. The voice coil motor as claimed in claim 12, wherein each grip portion extends from the corresponding contact portion.

14. The voice coil motor as claimed in claim 13, wherein the width of the slot is substantially equal to the thickness of the second plate.

* * * * *